United States Patent [19]

Arakawa

[11] Patent Number: 5,530,259
[45] Date of Patent: Jun. 25, 1996

[54] RADIATION IMAGE READ-OUT APPARATUS

[75] Inventor: Satoshi Arakawa, Kanagawa-ken, Japan

[73] Assignee: Fuji Photo Film Co., Ltd., Kanagawa, Japan

[21] Appl. No.: 474,657

[22] Filed: Jun. 7, 1995

[30] Foreign Application Priority Data

Aug. 18, 1994 [JP] Japan ................................ 6-194315

[51] Int. Cl.⁶ ................................................ G03B 42/02
[52] U.S. Cl. ........................ 250/584; 250/585; 250/586; 250/588; 250/589; 250/590
[58] Field of Search ........................ 250/590, 589, 250/588, 586, 585, 584

[56] References Cited

U.S. PATENT DOCUMENTS

| | | | |
|---|---|---|---|
| 4,754,144 | 6/1988 | Seto | 250/484.1 |
| 4,761,554 | 8/1988 | Yoshimura et al. | 250/590 |
| 4,816,676 | 3/1989 | Aagano | 250/582 |

FOREIGN PATENT DOCUMENTS

| | | |
|---|---|---|
| 62-124549 | 6/1987 | Japan . |
| 63-298333 | 12/1988 | Japan . |
| 3-265841 | 11/1991 | Japan ................................ 250/589 |
| 4-3150 | 1/1992 | Japan ................................ 250/590 |

*Primary Examiner*—Constantine Hannaher
*Attorney, Agent, or Firm*—Sughrue, Mion, Zinn, Macpeak & Seas

[57] ABSTRACT

A radiation image read-out apparatus includes cassette support devices for releasably supporting at least two cassettes, each of which can house a single stimulable phosphor sheet therein. A read-out unit moves between at least two read-out positions, each of which corresponds to one of the cassettes supported by the cassette support devices, and at each of which a radiation image is read out from a stimulable phosphor sheet taken out of each cassette. An erasing device is located so as to correspond to each read-out position. A sheet conveyance system takes a stimulable phosphor sheet out of each cassette, conveys the stimulable phosphor sheet into the read-out unit and the erasing device, and then returns the stimulable phosphor sheet into the cassette. The waiting period of the read-out unit and the waiting period of the erasing device are kept short, and the cycle time for the image read-out and erasing operations is thereby kept short as a whole.

3 Claims, 6 Drawing Sheets

RADIATION IMAGE READ-OUT APPARATUS

BACKGROUND OF THE INVENTION

1. Field of the Invention

This invention relates to a radiation image read-out apparatus. This invention particularly relates to a radiation image read-out apparatus, wherein a radiation image is read out from a stimulable phosphor sheet, on which the radiation image has been stored and which has been taken out of a cassette, the stimulable phosphor sheet is then erased, and the erased stimulable phosphor sheet, which is now reusable for the recording of a radiation image, is returned into the original cassette.

2. Description of the Prior Art

It has been proposed to use stimulable phosphors in radiation image recording and read-out apparatuses. Specifically, a radiation image of an object, such as a human body, is recorded on a sheet, which comprises a substrate and a layer of the stimulable phosphor overlaid on the substrate (hereinafter referred to as a stimulable phosphor sheet). In a radiation image read-out apparatus, the stimulable phosphor sheet, on which the radiation image has been stored, is exposed to stimulating rays, such as a laser beam, which cause the stimulable phosphor sheet to emit light in proportion to the amount of energy stored thereon during its exposure to the radiation. The light emitted by the stimulable phosphor sheet, upon stimulation thereof, is photoelectrically detected and converted into an electric image signal. The stimulable phosphor sheet, from which the image signal has been detected, is exposed to erasing light or heat, and energy remaining on the stimulable phosphor sheet is thereby released.

The image signal, which has been obtained with the radiation image read-out apparatus, is subjected to image processing, such as gradation processing or frequency processing, such that a visible radiation image having good image quality can be reproduced from the processed image signal and used as an effective tool in, particularly, the accurate and efficient diagnosis of an illness. The processed image signal is then used for the reproduction of a visible image on a recording material. The stimulable phosphor sheet, from which the image signal has been detected, is erased and reused for the recording of a radiation image.

Ordinarily, the stimulable phosphor sheet described above is housed in a light-tight cassette. Each cassette serves to house a single stimulable phosphor sheet therein. At least part of the cassette can be opened in order for a stimulable phosphor sheet to be fed into and out of the cassette. The openable part of the cassette is releasably supported by a cassette support means of a radiation image read-out apparatus. In the radiation image read-out apparatus, the stimulable phosphor sheet, which is housed in the cassette supported by the cassette support means and on which a radiation image has been stored, is taken out of the cassette by a sheet conveyance means and conveyed into an image read-out means. The radiation image is then read out of the stimulable phosphor sheet. Thereafter, energy remaining on the stimulable phosphor sheet is erased by an erasing means, and the erased stimulable phosphor sheet is returned to the original cassette. Such radiation image read-out apparatuses are described in, for example, Japanese Unexamined Patent Publication Nos. 62(1987)-124549 and 63(1988)-298333.

However, with the radiation image read-out apparatus described above, a predetermined time is required for each of the operation for reading out a radiation image and the erasing operation. For example, when the stimulable phosphor sheet, from which an image signal has been detected, is being erased, the image read-out operation is ceased in the image read-out means. Therefore, in cases where images are read out and erased from a large number of stimulable phosphor sheets, a long waiting period occurs.

SUMMARY OF THE INVENTION

The primary object of the present invention is to provide a radiation image read-out apparatus, wherein an operation for reading out a radiation image from a stimulable phosphor sheet, on which the radiation image has been stored, and an operation for erasing energy remaining on the stimulable phosphor sheet, from which an image signal has been detected, are carried out such that a waiting period of an image read-out means and a waiting period of an erasing means may be kept short, and the cycle time for the image read-out and erasing operations is thereby kept short as a whole.

The present invention provides a radiation image read-out apparatus, wherein a stimulable phosphor sheet, on which a radiation image has been stored, is exposed to stimulating rays, which cause the stimulable phosphor sheet to emit light in proportion to the amount of energy stored thereon during its exposure to radiation, and the emitted light is photoelectrically detected, an image signal representing the radiation image being thereby obtained, the apparatus comprising:

i) cassette support means for releasably supporting at least two cassettes, each of which is capable of housing a single stimulable phosphor sheet therein, one end of each cassette being capable of being opened and closed, ii) a read-out unit capable of being moved between at least two read-out positions, each of which corresponds to one of the cassettes having been supported by the cassette support means, and at each of which a radiation image is read out from a stimulable phosphor sheet having been taken out of each of the cassettes, the read-out unit carrying out a radiation image read-out operation at each of the read-out positions by exposing the stimulable phosphor sheet to the stimulating rays, iii) erasing means, which is located so as to correspond to each of the read-out positions and erases energy remaining on a stimulable phosphor sheet after an image signal has been detected therefrom, iv) sheet conveyance means for taking a stimulable phosphor sheet out of each of the cassettes, receiving the stimulable phosphor sheet, which has been taken out of each of the cassettes, conveying the stimulable phosphor sheet into the read-out unit and the erasing means, and thereafter returning the stimulable phosphor sheet into the cassette, and v) unit moving means for moving the read-out unit to a read-out position corresponding to a cassette, in which a stimulable phosphor sheet to be subjected to the radiation image read-out operation is housed, and supporting the read-out unit at the read-out position until the radiation image read-out operation is finished.

With the radiation image read-out apparatus in accordance with the present invention, at least two cassettes are supported by the cassette support means. The read-out unit is moved by the unit moving means to a position corresponding to a first cassette, in which a first stimulable phosphor sheet to be subjected to the radiation image read-out operation is housed. Thereafter, the sheet conveyance means takes the first stimulable phosphor sheet out of the first cassette and conveys it into the read-out unit and the erasing means. The read-out unit is kept at the read-out position until the operation for reading out the radiation image from the first stimulable phosphor sheet is finished. In the read-out unit, the radiation image is read out from the first stimulable phosphor sheet. After the operation for reading out the radiation image from the first stimulable phosphor sheet is finished, the first stimulable phosphor sheet is fed into the erasing means, and energy remaining on the first stimulable phosphor sheet is erased. While the operation for erasing energy remaining on the first stimulable phosphor sheet is being carried out, a second cassette, which houses a second stimulable phosphor sheet therein, is supported by the cassette support means, the read-out unit is moved to the read-out position corresponding to the second cassette, and a radiation image is read out from the second stimulable phosphor sheet. While the radiation image is being read out from the second stimulable phosphor sheet, the operation for erasing energy remaining on the first stimulable phosphor sheet is finished. The erased first stimulable phosphor sheet is returned by the sheet conveyance means into the first cassette. After the operation for reading out the radiation image from the second stimulable phosphor sheet is finished, the second stimulable phosphor sheet is conveyed into the erasing means, and energy remaining on the second stimulable phosphor sheet is erased. During this period of time, for example, the first cassette is replaced by a third cassette. The third cassette, which houses a third stimulable phosphor sheet to be subjected to a radiation image read-out operation, is thus supported by the cassette support means. The read-out unit is then moved to the read-out position corresponding to the third cassette, and the radiation image is read out from the third stimulable phosphor sheet. In this manner, with the radiation image read-out apparatus in accordance with the present invention, while the erasing operation is being carried out on a stimulable phosphor sheet, the radiation image read-out operation can be carried out on a different stimulable phosphor sheet. Therefore, the waiting period with respect to the radiation image read-out operation and the waiting period with respect to the erasing operation can be kept short. As a result, the cycle time for the image read-out and erasing operations can be kept short as a whole, and the image read-out operation can be carried out efficiently.

DESCRIPTION OF THE PREFERRED EMBODIMENTS

The present invention will hereinbelow be described in further detail with reference to the accompanying drawings.

Figure 1:
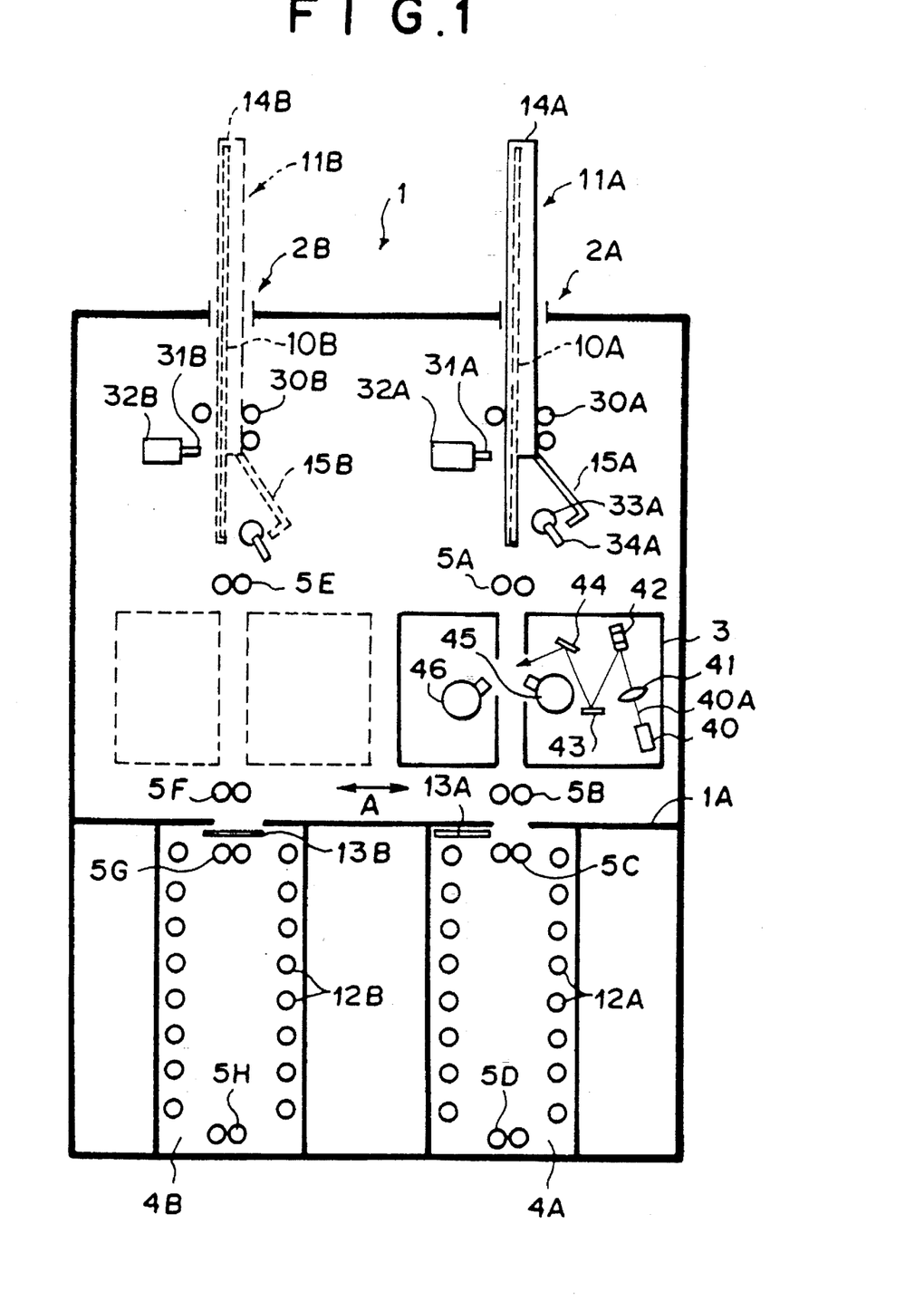
FIG. 1 is a schematic view showing a first embodiment of the radiation image read-out apparatus in accordance with the present invention.

FIG. 1 is a schematic view showing a first embodiment of the radiation image read-out apparatus in accordance with the present invention. As illustrated in FIG. 1, a radiation image read-out apparatus 1 comprises two cassette support means 2A and 2B, into which two cassettes 11A and 11B are respectively loaded. The cassette 11A houses therein a stimulable phosphor sheet 10A, on which a radiation image has been stored with a radiation image recording apparatus (not shown). Also, the cassette 11B houses therein a stimulable phosphor sheet 10B, on which a radiation image has been stored with a radiation image recording apparatus (not shown). The radiation image read-out apparatus 1 also comprises a read-out unit 3 for reading out the radiation image from each of the stimulable phosphor sheets 10A and 10B. The radiation image read-out apparatus 1 further comprises two erasing zones 4A and 4B, which respectively correspond to the cassette support means 2A and 2B. In each of the erasing zones 4A and 4B, energy remaining on each of the stimulable phosphor sheets 10A and 10B, from which an image signal has been detected, is erased. The radiation image read-out apparatus 1 still further comprises a sheet conveyance means, which is constituted of pairs of rollers 5A through 5H. The sheet conveyance means takes the stimulable phosphor sheet 10A out of the cassette 11A, conveys the stimulable phosphor sheet 10A, which has been taken out of the cassette 11A, into the read-out unit 3 and the erasing zone 4A, and conveys the stimulable phosphor sheet 10A from the erasing zone 4A into the cassette 11A. Also, the sheet conveyance means takes the stimulable phosphor sheet 10B out of the cassette 11B, conveys the stimulable phosphor sheet 10B, which has been taken out of the cassette 11B, into the read-out unit 3 and the erasing zone 4B, and conveys the stimulable phosphor sheet 10B from the erasing zone 4B into the cassette 11B.

The read-out unit 3 is reciprocally moved by a unit moving means 6, which will be described below, along the horizontal directions indicated by the double headed arrow A. The unit moving means 6 will be described hereinbelow.

Figure 2:
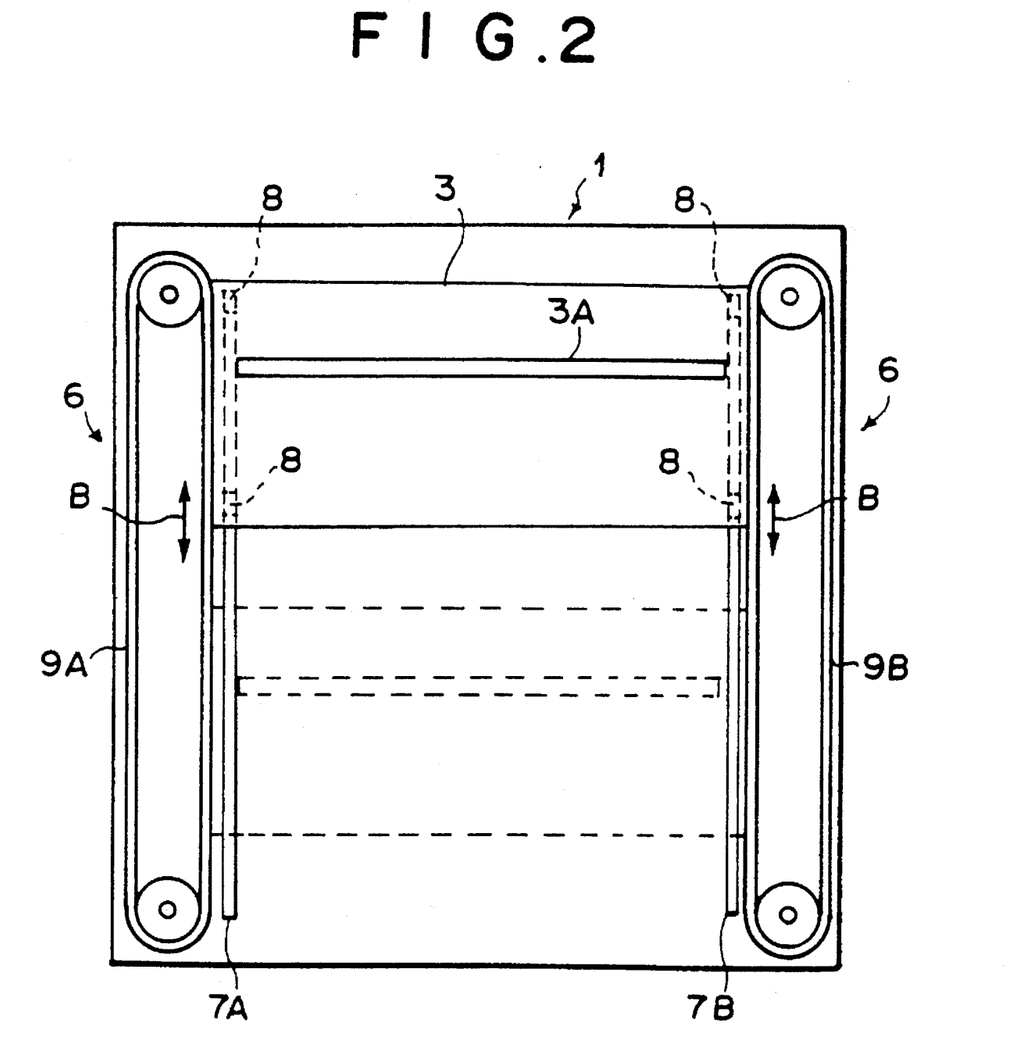
FIG. 2 is a schematic view showing an example of a mechanism for moving a read-out unit.

FIG. 2 shows the unit moving means 6 for moving the read-out unit 3.

As illustrated in FIG. 2, the unit moving means 6 comprises two parallel guide rails 7A and 7B located on a plate 1A, which defines the erasing zones 4A and 4B in the radiation image read-out apparatus 1. The unit moving means 6 also comprises two pairs of casters 8, 8, 8, 8, which are secured to the bottom surface of the read-out unit 3. The two pairs of the casters 8, 8, 8, 8 are spaced a distance, which is approximately equal to the distance between the guide rails 7A and 7B, from each other and are placed on the guide rails 7A and 7B. The unit moving means 6 further comprises endless belts 9A and 9B, which are secured to the read-out unit 3 and driven by motors (not shown) serving as a drive means. When the motors rotate, the endless belts 9A and 9B are reciprocally moved in the directions indicated by the double headed arrow B. As a result, the read-out unit 3 is reciprocally moved on the guide rails 7A and 7B and in the directions indicated by the double headed arrow A. In this manner, the read-out unit 3 is moved such that the stimulable phosphor sheet 10A or 10B can be fed through a sheet feed-in opening 3A into the read-out unit 3 at each of the read-out positions, which correspond to the cassette support means 2A and 2B.

Figure 3:
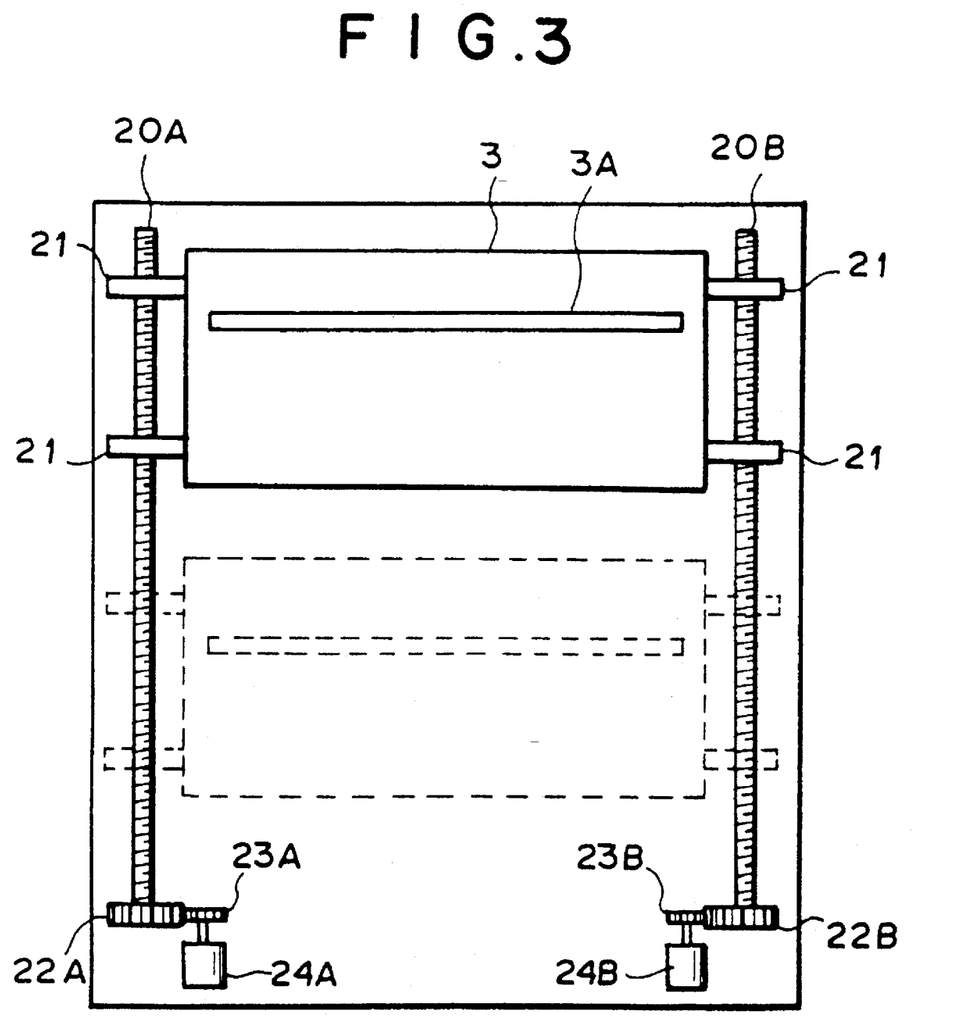
FIG. 3 is a schematic view showing a different example of a mechanism for moving a read-out unit.

Alternatively, a unit moving means 6 shown in FIG. 3 may be employed. As illustrated in FIG. 3, the unit moving means 6 comprises screw rods 20A and 20B for reciprocally moving the read-out unit 3 and extending in the direction, along which the read-out unit 3 is to be moved. The unit moving means 6 also comprises unit support parts 21, 21, 21, 21, which are fitted onto the screw rods 20A and 20B. The unit moving means 6 further comprises gears 22A and 22B, which are respectively supported on the screw rods 20A and 20B. The unit moving means 6 still further comprises gears 23A and 23B, which are respectively engaged with the gears 22A and 22B, and motors 24A and 24B, which respectively rotate the gears 23A and 23B in normal and reverse directions. When the motors 24A and 24B rotate, the gears 23A and 22A and the gears 23B and 22B are rotated. As a result, the screw rods 20A and 20B are rotated, and the unit support parts 21, 21, 21, 21 are thereby moved. In this manner, the read-out unit 3 is moved reciprocally.

In the erasing zone 4A, a plurality of erasing light sources 12A, 12A, . . . are located on both sides of the pair of rollers 5C, 5C and the pair of rollers 5D, 5D. Also, in the erasing zone 4B, a plurality of erasing light sources 12B, 12B, . . . are located on both sides of the pair of rollers 5G, 5G and the pair of rollers 5H, 5H. In this embodiment, the erasing light sources 12A, 12A, . . . and the erasing light sources 12B, 12B, . . . are always turned on during the operation of the radiation image read-out apparatus 1. Therefore, shutters 13A and 13B are respectively located at inlets of the erasing zones 4A and 4B. When the radiation image read-out operation is carried out by the read-out unit 3, the shutters 13A and 13B respectively close the inlets of the erasing zones 4A and 4B and thereby block the erasing light. When the stimulable phosphor sheet 10A is to be conveyed into the erasing zone 4A, the shutter 13A opens the inlet of the erasing zone 4A. Also, when the stimulable phosphor sheet 10B is to be conveyed into the erasing zone 4B, the shutter 13B opens the inlet of the erasing zone 4B. The pair of the rollers 5B, 5B and the pair of the rollers 5F, 5F of the sheet conveyance means are constituted as light shielding rollers. When the shutter 13A is opened, the pair of the light shielding rollers 5B, 5B prevent the erasing light from entering into the read-out unit 3. Also, when the shutter 13B is opened, the pair of the light shielding rollers 5F, 5F prevent the erasing light from entering into the read-out unit 3.

As illustrated in FIG. 1, in this embodiment, the cassette 11A, which is supported by the cassette support means 2A, is provided with a thin box member 14A and a cover member 15A for opening and closing an opening, which is formed in the box member 14A and through which the stimulable phosphor sheet 10A is to be fed into and out of the box member 14A. By way of example, the box member 14A and the cover member 15A are constituted of a synthetic resin. The cover member 15A is mounted on the box member 14A such that the cover member 15A can swing around a swing axis, which is approximately parallel to the stimulable phosphor sheet 10A having been housed in the box member 14A. The cover member 15A opens and closes the opening by swinging in this manner. The back surface of the box member 14A is provided with a support member receiving circular hole (not shown). Such that the cover member 15A can swing in the manner described above, for example, a known hinge mechanism may be employed. Alternatively, the box member 14A and the cover member 15A may be integrally molded by using a synthetic resin such that the cover member 15A can be bent along a hinge line with respect to the box member 14A.

The cassette 11B, which is supported by the cassette support means 2B, has the same structure as the structure of the cassette 11A. Specifically, the cassette 11B is provided with a thin box member 14B and a cover member 15B for opening and closing an opening, which is formed in the box member 14B and through which the stimulable phosphor sheet 10B is to be fed into and out of the box member 14B. By way of example, the box member 14B and the cover member 15B are constituted of a synthetic resin. The cover member 15B is mounted on the box member 14B such that the cover member 15B can swing around a swing axis, which is approximately parallel to the stimulable phosphor sheet 10B having been housed in the box member 14B. The cover member 15B opens and closes the opening by swinging in this manner. The back surface of the box member 14B is provided with a support member receiving circular hole (not shown). Such that the cover member 15B can swing in the manner described above, for example, a known hinge mechanism may be employed. Alternatively, the box member 14B and the cover member 15B may be integrally molded by using a synthetic resin such that the cover member 15B can be bent along a hinge line with respect to the box member 14B.

The cassette 11A, in which a stimulable phosphor sheet 10A has been housed, is subjected to an operation for recording a radiation image in a radiation image recording apparatus (not shown). Thereafter, the cassette 11A is loaded into the radiation image read-out apparatus 1 as illustrated in FIG. 1. The cassette support means 2A is provided with a fixed guide member (not shown), which regulates the position of the left end of the cassette 11A from the exterior of the cassette 11A, a fixed guide member (not shown), which regulates the position of the right end of the cassette 11A from the exterior of the cassette 11A, and a pair of light shielding rollers 30A, 30A, which also serve to support the cassette 11A. Also, the cassette support means 2B is provided with a fixed guide member (not shown), which regulates the position of the left end of the cassette 11B from the exterior of the cassette 11B, a fixed guide member (not shown), which regulates the position of the right end of the cassette 11B from the exterior of the cassette 11B, and a pair of light shielding rollers 30B, 30B, which also serve to support the cassette 11B.

A locking roller is mounted on each of the fixed guide members such that the locking roller can rotate. The length of each of the light shielding rollers 30A, 30A is slightly longer than the width of the cassette 11A. The light shielding rollers 30A, 30A are urged by urging means (not shown) in the directions heading toward each other and are kept by stoppers in a slightly spaced state from each other. Also, the length of each of the light shielding rollers 30B, 30B is slightly longer than the width of the cassette 11B. The light shielding rollers 30B, 30B are urged by urging means (not shown) in the directions heading toward each other and are kept by stoppers in a slightly spaced state from each other.

When the cassette 11A is loaded into the radiation image read-out apparatus 1, one end of the cassette 11A, i.e. the end provided with the opening, is inserted into the cassette setting opening from above and passed between the light shielding rollers 30A, 30A. At this time, the light shielding rollers 30A, 30A are slightly moved in directions heading away from each other and receive the cassette 11A. When the cassette 11A is inserted to a predetermined position, the end of the cassette 11A comes into contact with stoppers, which are respectively formed on the fixed guide members, and the cassette 11A is thereby set at the predetermined position. In the radiation image read-out apparatus 1, a cassette support pin 31A is located at the position facing the support member receiving circular hole of the cassette 11A, which has been set at the predetermined position. The cassette support pin 31A can be moved by an electromagnetic actuator 32A along the longitudinal direction, i.e. along the horizontal direction in FIG. 1. When the cassette 11A is loaded into the radiation image read-out apparatus 1, the cassette support pin 31A is set at a position that does not interfere with the cassette 11A.

The cassette 11B is loaded into the radiation image read-out apparatus 1 in the same manner as that for the cassette 11A. Specifically, one end of the cassette 11B, i.e. the end provided with the opening, is inserted into the cassette setting opening from above and passed between the light shielding rollers 30B, 30B. At this time, the light shielding rollers 30B, 30B are slightly moved in directions heading away from each other and receive the cassette 11B. When the cassette 11B is inserted to a predetermined position, the end of the cassette 11B comes into contact with stoppers, which are respectively formed on the fixed guide members, and the cassette 11B is thereby set at the predetermined position. In the radiation image read-out apparatus 1, a cassette support pin 31B is located at the position facing the support member receiving circular hole of the cassette 11B, which has been set at the predetermined position. The cassette support pin 31B can be moved by an electromagnetic actuator 32B along the longitudinal direction, i.e. Along the horizontal direction in FIG. 1. When the cassette 11B is loaded into the radiation image read-out apparatus 1, the cassette support pin 31B is set at a position that does not interfere with the cassette 11B.

How the radiation image read-out apparatus 1 operates will be described hereinbelow with reference to FIG. 1 and FIGS. 4A, 4B, 4C, and 4D.

Figure 4A:
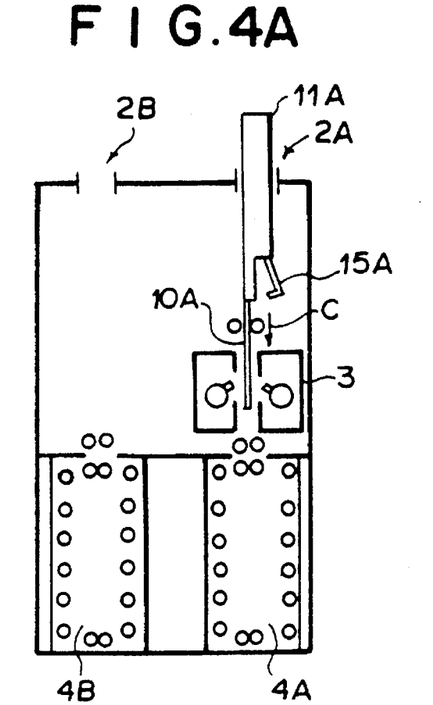
FIGS. 4A, 4B, 4C, and 4D are schematic views showing how the first embodiment of FIG. 1 operates.

As illustrated in FIG. 4A, the cassette 11A houses therein the stimulable phosphor sheet 10A, on which a radiation image has been stored in a radiation image recording apparatus (not shown). The cassette 11A is loaded into the cassette support means 2A of the radiation image read-out apparatus 1. Thereafter, the cover member 15A of the cassette 11A is opened, and a roller arm 34A, which is provided with a roller 33A at an end, is moved into the cassette 11A. At the time at which the roller 33A comes into contact with the stimulable phosphor sheet 10A, which is housed in the cassette 11A, the roller arm 34A is stopped. When the roller arm 34A has been stopped, the electromagnetic actuator 32A is operated, and the cassette support pin 31A is inserted into the support member receiving circular hole of the cassette 11A.

Thereafter, the roller 33A is rotated by a drive means (not shown) in the counter-clockwise direction in FIG. 1. As a result, the stimulable phosphor sheet 10A, which is in contact with the roller 33A, is moved down and taken out of the cassette 11A through its opening.

At this time, when the cassette 11A is loaded into the cassette support means 2A, the read-out unit 3 moves to the read-out position, which is indicated by the solid lines in FIGS. 1 and 4A and at which the radiation image can be read out from the stimulable phosphor sheet 10A having been taken out of the cassette 11A.

As illustrated in FIG. 4A, the stimulable phosphor sheet 10A, which has been taken out of the cassette 11A, is conveyed by the rollers 5A, 5A in the direction indicated by the arrow C and is thus fed into the read-out unit 3.

The read-out unit 3 is provided with a stimulating ray scanning means. The stimulating ray scanning means comprises a stimulating ray source 40, which may be constituted of a semiconductor laser, or the like, and which produces stimulating rays 40A. The stimulating ray scanning means also comprises a condensing lens 41, which is located in the optical path of the stimulating rays 40A having been produced by the stimulating ray source 40. The stimulating ray scanning means further comprises a rotating polygon mirror 42, which serves as a light deflector. The rotating polygon mirror 42 deflects the stimulating rays 40A, which have passed through the condensing lens 41, in the direction normal to the plane of the sheet of FIG. 1 such that stimulating rays 40A may scan the stimulable phosphor sheet 10A in a main scanning direction. The stimulating ray scanning means still further comprises mirrors 43 and 44 for changing the direction of the optical path of the stimulating rays 40A. The stimulating rays 40A are caused by the stimulating ray scanning means to repeatedly scan the stimulable phosphor sheet 10A in the main scanning direction. At the same time, the stimulable phosphor sheet 10A is conveyed by the rollers 5A, 5A at a predetermined speed in the direction indicated by the arrow C. Therefore, the position that is being scanned with the stimulating rays 40A shifts in the direction indicated by the arrow C, i.e. in a sub-scanning direction. In this manner, approximately the entire area of the stimulable phosphor sheet 10A is exposed to the stimulating rays 40A. When the stimulable phosphor sheet 10A is exposed to the stimulating rays 40A, the exposed portion of the stimulable phosphor sheet 10A emits light in proportion to the amount of energy stored thereon during its exposure to radiation. The emitted light is detected by a photoelectric read-out means of the read-out unit 3.

In this embodiment, the photoelectric read-out means is constituted of two long photomultipliers 45 and 46, which extend along the main scanning direction at least over the length of the main scanning line. The photomultiplier 45 detects the light emitted by the front surface of the stimulable phosphor sheet 10A located on the side, to which the stimulating rays 40A are irradiated. The photomultiplier 46 detects the light emitted by the back surface of the stimulable phosphor sheet 10A located on the side opposite to the side, to which the stimulating rays 40A are irradiated. In this manner, the read-out unit 3 detects the light emitted by the two surfaces of the stimulable phosphor sheet 10A.

In the manner described above, two image signals, which represent the radiation image of an object stored on the stimulable phosphor sheet 10A, are obtained from the photomultipliers 45 and 46. The image signal components of the two image signals are then added to each other, which image signal components represent corresponding picture elements on the front and back surfaces of the stimulable phosphor sheet 10A. The image signal, which has been obtained from the addition process, is subjected to necessary image processing and is then fed into an image reproducing means, which may be constituted of a cathode ray tube (CRT) display device, a light beam scanning recording apparatus for recording an image on photographic film, or the like. In the image reproducing means, the image signal is used for the reproduction of a visible image.

Figure 4B:
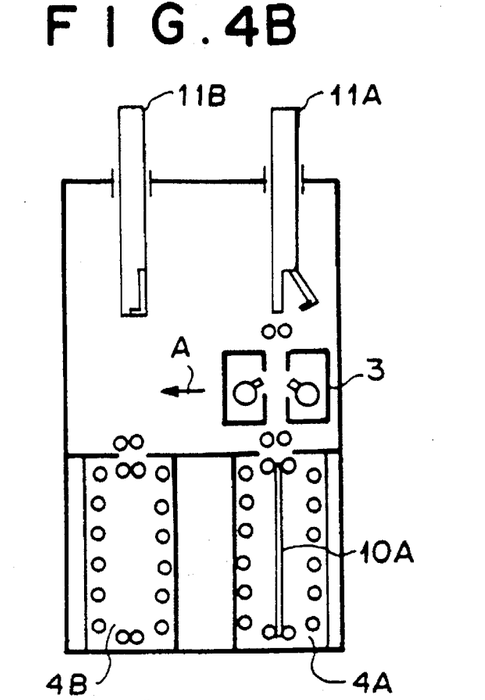

As illustrated in FIG. 4B, after the image signal has been detected from the stimulable phosphor sheet 10A, the stimulable phosphor sheet 10A is conveyed by the rollers 5B, 5B and the rollers 5C, 5C into the erasing zone 4A. In the erasing zone 4A, the stimulable phosphor sheet 10A is exposed to erasing light, and energy remaining on the stimulable phosphor sheet 10A is erased. While the stimulable phosphor sheet 10A having been taken out of the cassette 11A is being erased, the cassette 11B housing therein the stimulable phosphor sheet 10B, on which a radiation image has been stored with a radiation image recording apparatus (not shown), is loaded into the cassette support means 2B. When the cassette 11B has been loaded into the cassette support means 2B, the read-out unit 3 moves in the direction indicated by the arrow A in FIG. 4B to the position for the operation for reading out the radiation image from the stimulable phosphor sheet 10B, which is taken out of the cassette 11B.

Figure 4C:
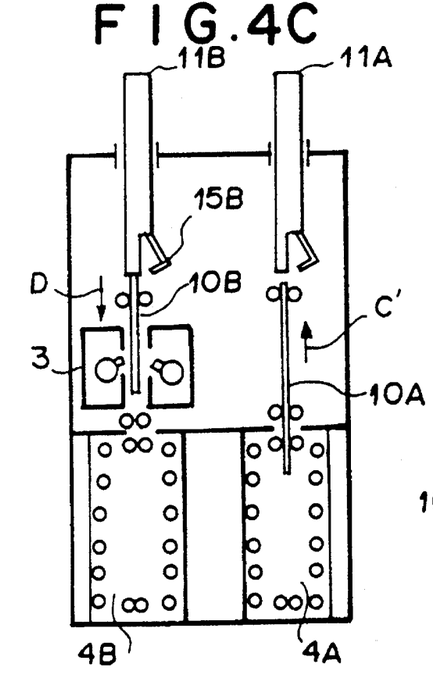

Thereafter, as illustrated in FIG. 4C, the cover member 15B of the cassette 11B is opened, and the stimulable phosphor sheet 10B is taken out of the cassette 11B. The stimulable phosphor sheet 10B is then conveyed by the rollers 5E, 5E in the direction indicated by the arrow D and is thus fed into the read-out unit 3. In the read-out unit 3, in the same manner as that for the stimulable phosphor sheet 10A, the stimulable phosphor sheet 10B is exposed to the stimulating rays 40A, and light carrying the radiation image information stored on the stimulable phosphor sheet 10B is emitted by the stimulable phosphor sheet 10B. The emitted light is detected by the photomultipliers 45 and 46. In this manner, two image signals, which represent the radiation image of an object stored on the stimulable phosphor sheet 10B, are obtained from the photomultipliers 45 and 46. The image signal components of the two image signals are then added to each other, which image signal components represent corresponding picture elements on the front and back surfaces of the stimulable phosphor sheet 10B. The image signal, which has been obtained from the addition process, is subjected to necessary image processing and is then fed into an image reproducing means, which may be constituted of a CRT display device, a light beam scanning recording apparatus for recording an image on photographic film, or the like. In the image reproducing means, the image signal is used for the reproduction of a visible image.

While the radiation image is being read out from the stimulable phosphor sheet 10B, the rollers 5B, 5B, the rollers 5C, 5C, and the rollers 5D, 5D rotate reversely, and the stimulable phosphor sheet 10A, which has been erased, is thereby conveyed in the direction indicated by the arrow C' and toward the cassette 11A.

Figure 4D:
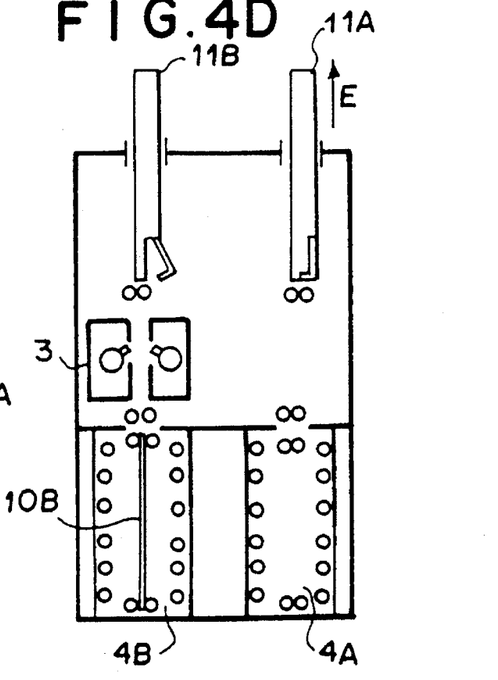

Thereafter, as illustrated in FIG. 4D, the stimulable phosphor sheet 10B, from which the image signal has been detected, is conveyed by the rollers 5E, 5E, the rollers 5F, 5F, and the rollers 5F, 5F and is thus fed into the erasing zone 4B. In the erasing zone 4B, the stimulable phosphor sheet 10B is exposed to the erasing light, and energy remaining on the stimulable phosphor sheet 10B is erased. While the stimulable phosphor sheet 10B, which has been taken out of the cassette 11B is being erased, the stimulable phosphor sheet 10A is returned into the cassette 11A, and the cover member 15A of the cassette 11A is closed. The cassette 11A is then removed from the cassette support means 2A. Thereafter, in cases where there is a third stimulable phosphor sheet, from which a radiation image is to be read out, a cassette in which the third stimulable phosphor sheet is housed, is loaded into the cassette support means 2A. The read-out unit 3 is then moved to the position for the operation for reading out the radiation image from the third stimulable phosphor sheet, which is taken out of the cassette having been loaded into the cassette support means 2A. The radiation image is thus read out from the third stimulable phosphor sheet. During this operation, the stimulable phosphor sheet 10B, which has been erased in the erasing zone 4B, is returned into the cassette 11B.

In this embodiment, as described above, the two cassette support means 2A, 2B and the two erasing zones 4A, 4B are located such that the erasing zone 4A may correspond to the cassette support means 2A and such that the erasing zone 4B may correspond to the cassette support means 2B. The read-out unit 3 can be moved to the read-out position, which is located between the cassette support means 2A and the erasing zone 4A, and to the read-out position, which is located between the cassette support means 2B and the erasing zone 4B. Therefore, while the stimulable phosphor sheet 10A, which has been taken out of the cassette 11A supported by the cassette support means 2A and from which the image signal has been detected, is being erased, the operation for reading out the radiation image can be carried out on the stimulable phosphor sheet 10B, which has been taken out of the cassette 11B supported by the cassette support means 2B. Further, while the radiation image is being read out from the stimulable phosphor sheet 10B, the stimulable phosphor sheet 10A, which has been erased, can be returned from the erasing zone 4A into the cassette 11A, which is loaded into the cassette support means 2A. In this manner, while the erasing operation, which takes the longest period among the periods for the steps in the radiation image read-out and erasing cycle, is being carried out, the radiation image read-out operation can be carried out. Therefore, the erasing operation can be carried out for a sufficiently long period, and the radiation image read-out operation and the erasing operation can be carried out efficiently. Accordingly, even if the radiation image read-out apparatus has no function for stacking a plurality of stimulable phosphor sheets and is thus small in size, the cycle time for the image read-out and erasing operations can be kept short.

Figure 5:
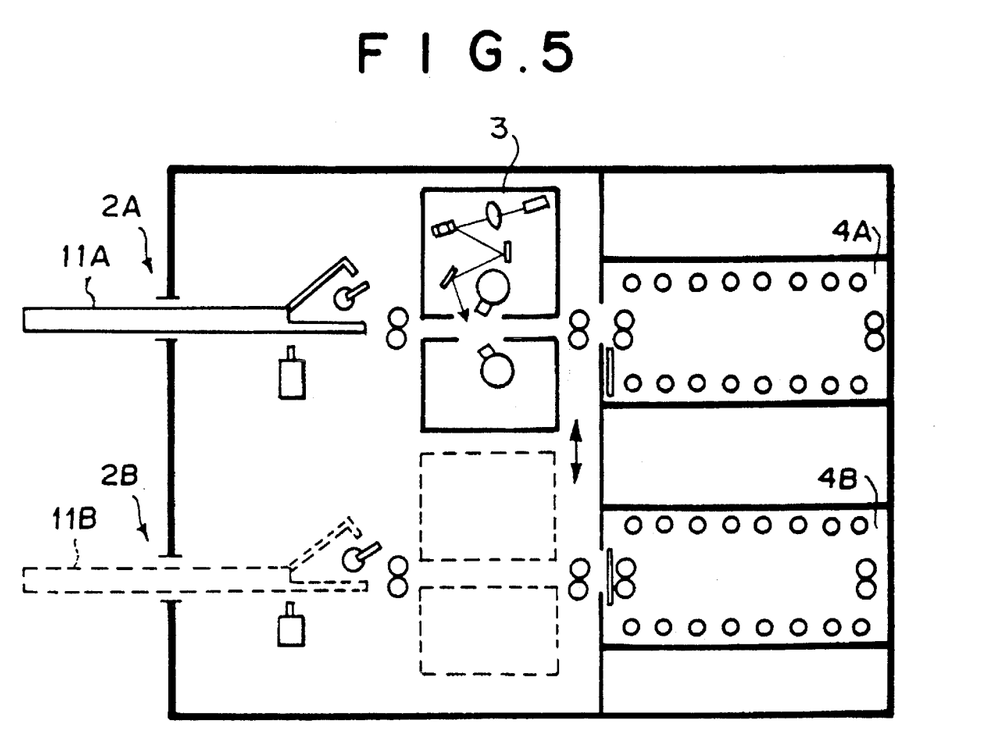
FIG. 5 is a schematic view showing a second embodiment of the radiation image read-out apparatus in accordance with the present invention.

In the aforesaid embodiment, the cassettes 11A and 11B are loaded into the radiation image read-out apparatus 1 from above. However, no limitation is imposed on how the cassettes are loaded into the radiation image read-out apparatus. For example, as illustrated in FIG. 5, the radiation image read-out apparatus may be constituted such that the cassettes 11A and 11B may be loaded horizontally into the radiation image read-out apparatus. In such cases, the read-out unit 3 moves vertically in FIG. 5. Also, each stimulable phosphor sheet is conveyed horizontally and subjected to the radiation image read-out and erasing operations.

Figure 6:
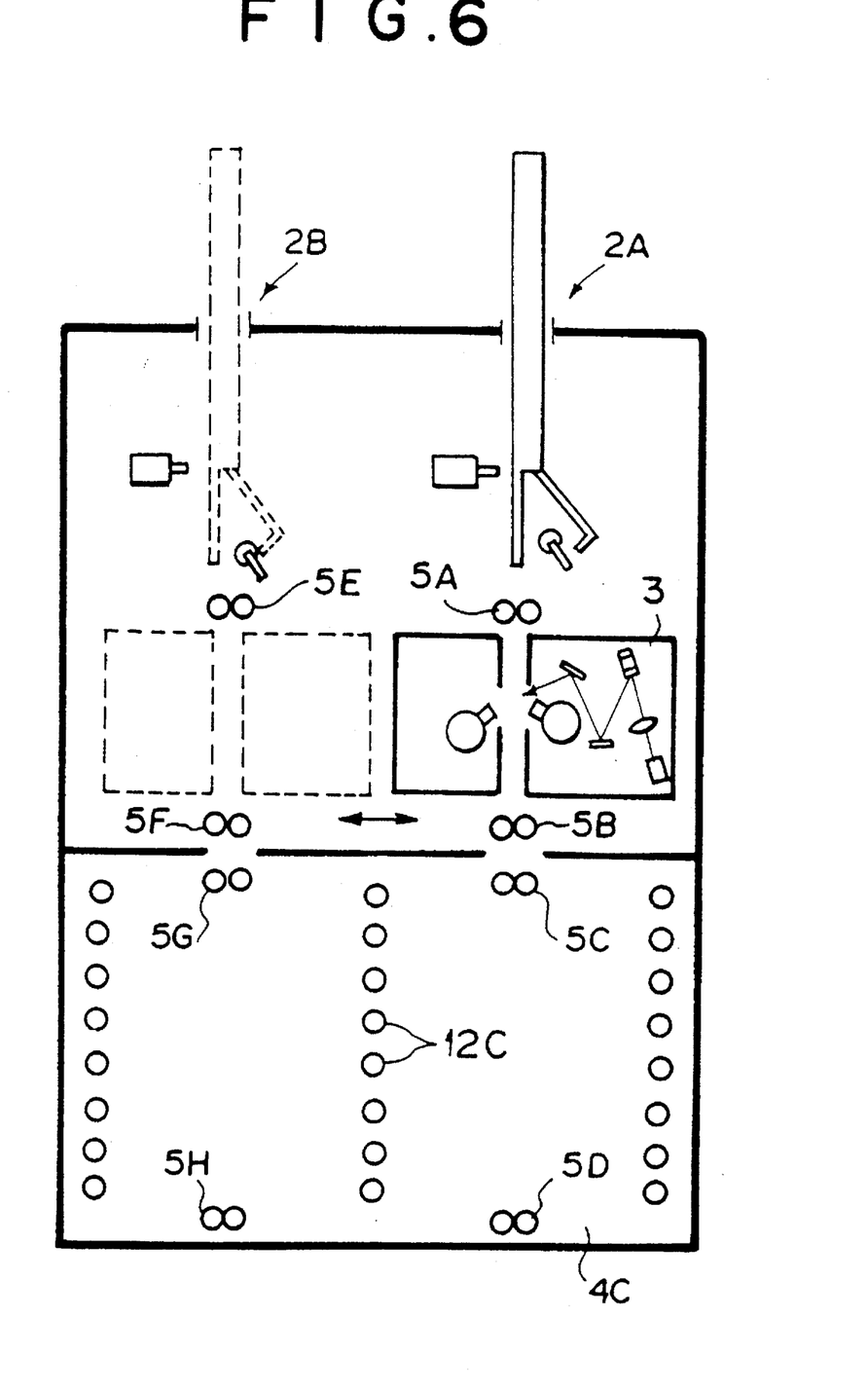
FIG. 6 is a schematic view showing a third embodiment of the radiation image read-out apparatus in accordance with the present invention.

Also, in the aforesaid embodiment, the two erasing zones 4A and 4B are provided as the erasing means for erasing energy remaining on the stimulable phosphor sheet after the image signal has been detected therefrom. However, no limitation is imposed on how the erasing means is constituted. For example, as illustrated in FIG. 6, the erasing means may be constituted of a single zone 4C. A plurality of erasing light sources 12C, 12C, . . . may be located between the rollers 5C, 5C, 5D, 5D and the rollers 5G, 5G, 5H, 5H. In this manner, the erasing light sources 12C, 12C, . . . may be utilized in order to erase both the stimulable phosphor sheet, which is conveyed by the rollers 5C, 5C, 5D, 5D, and the stimulable phosphor sheet, which is conveyed by the rollers 5G, 5G, 5H, 5H.

Further, in the embodiment described above, the two cassette support means 2A, 2B and the two erasing zones 4A, 4B are provided. Alternatively, three or more cassette support means and three or more erasing zones may be provided. In such cases, the read-out unit is moved by the unit moving means to three or more read-out positions, each of which is located between each cassette support means and each erasing zone.

What is claimed is:

1. A radiation image read-out apparatus, wherein a stimulable phosphor sheet, on which a radiation image has been stored, is exposed to stimulating rays, which cause the stimulable phosphor sheet to emit light in proportion to the amount of energy stored thereon during its exposure to radiation, and the emitted light is photoelectrically detected, an image signal representing the radiation image being thereby obtained, the apparatus comprising:

i) cassette support means for releasably supporting at least two cassettes, each of which is capable of housing a single stimulable phosphor sheet therein, one end of each cassette being capable of being opened and closed, ii) a read-out unit capable of being moved between at least two read-out positions, each of which corresponds to one of the cassettes having been supported by said cassette support means, and at each of which a radiation image is read out from a stimulable phosphor sheet having been taken out of each of the cassettes, said read-out unit carrying out a radiation image read-out operation at each of the read-out positions by exposing the stimulable phosphor sheet to the stimulating rays, iii) erasing means, which is located so as to correspond to each of the read-out positions and erases energy remaining on a stimulable phosphor sheet after an image signal has been detected therefrom, iv) sheet conveyance means for taking a stimulable phosphor sheet out of each of the cassettes, receiving said stimulable phosphor sheet, which has been taken out of each of the cassettes, conveying said stimulable phosphor sheet into said read-out unit and said erasing means, and thereafter returning said stimulable phosphor sheet into the cassette, and v) unit moving means for moving said read-out unit to a read-out position corresponding to a cassette, in which a stimulable phosphor sheet to be subjected to the radiation image read-out operation is housed, and supporting said read-out unit at said read-out position until the radiation image read-out operation is finished.

2. An apparatus as defined in claim 1 wherein said read-out unit is capable of detecting the light emitted by the two surfaces of a stimulable phosphor sheet.

3. An apparatus as defined in claim 1 wherein said stimulating rays are a laser beam.

* * * * *